3,378,382
HIGH-STRENGTH LIGHTWEIGHT AGGREGATE AND METHOD FOR ITS MANUFACTURE
William E. Burkett, Chino, Calif., assignor, by mesne assignments, to Pacific Vegetable Oil Corporation, San Francisco, Calif., a corporation of California
No Drawing. Filed June 25, 1965, Ser. No. 467,133
10 Claims. (Cl. 106—41)

ABSTRACT OF THE DISCLOSURE

A lightweight aggregate for use in concrete, bricks etc., having favorable strength characteristics is made by first mixing 90 to 99 parts by weight of ground clay, shale, or slate, 1 to 10 parts by weight of ground safflower seed hulls or other material having the water-absorbing characteristics, burnability, and gas-producing ability of safflower seed hulls, and 15 to 25 parts by weight of water. Then the mixture is quickly brought up to a sealing temperature (usually in the range of about 750° F. to 1100° F.). After sealing, the mixture is slowly heated to a bloating temperature (typically about 1600° F.), and then is heated to a higher firing temperature (typically 1800°–2000° F.) for providing a thick vitreous skin.

---

This invention relates to an improved high-strength burned lightweight aggregate and to a method for its manufacture.

The lightweight aggregate of this invention may be used in concrete products, including structural concrete, precast panels, concrete blocks, and poured concrete, and in burned clay products, including bricks and tiles.

It has long been known that lightweight aggregates could be prepared from combinations of clay, slate or shale materials and organic bloating agents such as coke, petroleum coke, some types of coal, petroleum oils, sawdust, and fly ash. However, in spite of the many known bloating-agent additives, the industry has not wholeheartedly adopted them, for the light weight was achieved at a cost of excessive weakness in the product. Also, uniformity of product was difficult to achieve with these prior art additives. Ability to adequately control the quality of the product has been lacking. The products had too wide a range of qualities, e.g., too great a tolerance in the ranges of densities and of strength; also the manufacturers were unable to increase or decrease density at will.

The present invention provides a strong lightweight aggregate, sufficiently bloated to be light in weight, while still strong enough to meet the specification standards for building materials. It also enables complete and thorough control of the quality of the product and of the manufacturing process. These results are achieved with the aid of a particular type of combustible organic material in clay, shale, or slate; when this particular type of organic material is burned out, it bloats the clay, shale or slate and leaves voids such that there results a lightweight but unusually strong aggregate.

The selling price per ton of lightweight aggregates is low; so the material can be sold competitively only when made at a relatively low cost, and also only when made close enough to the market so that transportation costs are not excessive. The present invention enables the use of a larger variety of clays, shales and slates than could be used heretofore for this purpose, thereby giving the manufacturer a wider choice of sites suitable for manufacture.

Another object of this invention is to enable the use of types of clay and shale, alone or in combination, that can produce lightweight aggregate of various colors, capable of use for decorative purposes.

Another object of this invention is to produce a lightweight aggregate suitable for the use in the manufacture of burned clay products. Aggregate produced according to this invention can be used in producing a very high strength lightweight brick. Also, due to the low amount of water required for extrusion and the high mechanical strength in the green state, bricks made by this invention can be readily handled without excess breaking, marking or deformation. Further, through the use of proper drying equipment, the drying time can be reduced 25% or more. A clear body, substantial fuel savings, and a shorter burning time also result from use of this invention.

This invention reduces shipping and packing costs, for the weight of the finished product can be reduced by about 10 to 70%, depending on the raw material and the amount of voids formed therein. Raw clay or shale or slate weighing, say, 80–120 pounds per cubic foot, can be used to produce strong aggregate weighing in the range of 20–45 pounds per cubic foot. Economy of transport and ease of handling of this aggregate are coupled with sufficient strength to meet ASTM standard requirements for structural concrete products and for burned clay products.

The invention helps improve the insulating value of the product, at both high and low temperatures, due to small voids in the aggregate particles with numerous separated air spaces in the body, caused by the burning out of the particular burn-out material of this invention. This, in turn, increases the usefulness of clay or shale or slate products made by this invention.

The present invention employs special gas-producing materials exemplified by the flakes of the hulls of safflower seeds or rice. Furthermore, particularly good results have been obtained by combining therewith the use of a weak solution of sodium silicate to provide the moisture for the clay-flake mix, which is then preferably extruded and burned.

A discovery of importance to this invention is that safflower seed hull flakes have properties which enable them to succeed where other particles have failed. The seed is grown for its oil, which is typically obtained by cracking open the seed, expressing the oil, and usually solvent-extracting the residue. The broken hulls are then separated from the meal in the residue, the meal being used as an animal feed. The hulls originally have very low oil content, but, as a result of the steps of oil expression and solvent extraction, the broken hull flakes by this time are generally coated with a thin oil film. Moreover, safflower oil is a drying oil. As a result, these flakes are much less water absorbent than are cellulose particles generally. Typically, these flakes have an oil content of one to two percent, which is substantially confined to the surface, where it dries and acts as a waterproofing agent, which greatly reduces the amount of water that can get inside the hull flakes and swell them. This lack of over-swelling is one of the key factors of this invention, for one trouble with the prior art was that such materials as sawdust, wood chips, chaff, seed hulls and other cellulosic materials took in water from the moistened clay and swelled greatly, leaving voids that were too large and causing ruptures between voids as the water vapor was driven off.

Rice hull flakes are water absorbent; test results showed wet rice hulls had a water-to-solids ratio of from about 1.6:1 to about 1.8:1; when rice hulls were used as a bloating agent, an inferior lightweight aggregate of low strength was formed. However, according to the present invention, rice hulls can be treated prior to their incorporation into the clay or shale materials, by spraying them with a light coating of waterproofing oil, such as a 50–50 mix of diesel oil and kerosene. Test results show certain treated rice hulls could be soaked in water for 24 hours and still have a water-to-solids ratio of 1.10:1, whereas when rice hulls from the same batch were soaked in water for 24 hours, they had a water-to-solids ratio of 1.65:1. To obtain the best results when using rice hulls as a bloating agent, the treatment with oil should be just prior to mixing the hulls with the clay or shale. This is one way of obtaining an organic bloating agent with properties like those of safflower seed hulls. In contrast, sawdust, even when so treated does not have these properties and does not give equivalent results.

Another finding of this invention is that flakes from either safflower or treated rice hulls in which a majority of the particles were no larger than 20 mesh Tyler screen and no smaller than 60 mesh Tyler screen gave the most satisfactory results. This range can easily be obtained by screening the safflower or rice hull flakes. For example, excellent results are obtained from a size assortment such as: 30% larger than 20 mesh, 50% smaller than 20 and larger than 35 mesh, 20% smaller than 35 mesh and larger than 60 mesh, and 25% smaller than 30 mesh. If there are many large particles, they are preferably broken, as by a quick grinding or crushing operation.

There is still some absorption of water by safflower or by treated rice hulls, and since even this much absorption has some significance on certain clays or shales, I have found that with some clays and shales the desired final aggregate strength and the desired uniformity can be best obtained by using a weak solution of sodium silicate to provide the moisture for the wet clay mix. Thus a 38% aqueous solution of sodium silicate may be added in quantities from about ½ of 1% to about 2% of the amount of water, in those materials where such addition proves helpful. With some clays, slates, and shales, those low in sand content, the required strength specifications can be obtained with water alone, but the sodium silicate solution has been found to hold the material together more coherently after extrusion or pelletizing, especially with high-sand-content slates, shales and clays. The use of sodium silicate solution helps to maintain size tolerance, and it reduces swelling and pellet weakness. Also, the sodium silicate tends to lubricate the clay or shale as it moves through the extrusion or pellet machine and helps reduce the amount of water needed for this purpose. In addition, in many cases it adds substantially to the strength of the final aggregate while costing very little, the cost increase being more than offset by eliminating the need for rehandling or reprocessing broken pellets and fines.

Safflower hulls and treated rice hulls help to reduce friction in the extrusion process, Also, tests show that in most cases, lamination separation, which means separation of laminae resulting from different flow rates of center portions from circumferential portions through extrusion dies, has been eliminated by this invention.

Other objects and advantages of the invention will appear from the following description of some preferred embodiments thereof.

The lightweight aggregate manufacturing process is basically well known, but the invention provides some important innovations.

Clay or shale mined by any conventional method may be fed into a surge hopper at the plant and may go from there through a roll crusher into a stock pile. From the stock pile, the material may be fed into a hopper-type bin, often through an automatic feeder, whence it typically goes through a crusher. An elevator may carry the resulting material over a set of screens, and anything greater than ten mesh may be returned to the crusher, while the particles finer than ten mesh go into another bin-type hopper. An automatic feeder may then be employed to feed the material into an extrusion or pelletizing machine, possibly via a pug mill.

Before the material reaches the extruder or pelletizer, the organic additive of this invention (such as safflower hulls or treated rice hulls) is added in the right proportions, as from another storage hopper. The quantity of hulls to be added depends on the inherent bloatability of the clay, shale or slate, which in turn depends on the amount of organic material they contain as mined. The mix of clay, slate or shale and safflower hulls, rice hulls, or such may be cut into cubes or rolled into small pellets. The pelletizer may be either of the disc type or of the extrusion type. The pellets or cubes may be moved by a conveyor to a dryer, as when more water is used for extrusion than is desirable for firing. There the moisture content of the pellets is preferably reduced to about 4% moisture. Next, the cubes or pellets may go through a roll crusher and from there an elevator may carry them to a set of screens whose mesh depends upon the size of the material or aggregates being produced. Coarse pieces that go over the coarse screens are preferably returned to the crusher. The fines that drop through the fine screens may be returned to the hopper feeder ahead of the crusher, to be reused. The in-between material may be dropped into a hopper feeder and from there fed into the charging unit of a kiln for bloating; the kiln may be a rotating type or a non-rotating type. The time and temperature required for the bloating operation depends entirely on the raw materials being used. Some materials require 2200–2400 degrees F.; others will bloat very well at 1600 to 1900 degrees F. Preferably, the material is first quickly heated to a sealing temperature of about 750° to 1100° F. An important feature is that the bloating, firing, and vitreous sealing in the kiln are done in a reducing or at least non-oxidizing atmosphere. In this invention, the organic gas-producing material helps both as a fuel and as a reducing agent. This helps to save fuel, reduce cost, and get better bloating.

Upon leaving the kiln, the pellets or cubes may drop into a cooler, which reduces the temperature gradually, so they do not crack when exposed to the atmosphere. The cooler may also be used as a source of heat to be employed by the dryer, the heat being transmitted from the cooler through a series of ducts and put into a rotary type dryer. The cool fired cubes are preferably moved by an elevator to a set of screens for sizing, and when sized go into respective bins waiting for shipment or further processing.

Example 1.—Shale mixed with safflower seed hull flakes

Shale weighing eighty pounds per cubic foot, taken from a pit in San Bernardino County, Calif., was mixed with safflower seed hulls lying within the preferred range of twenty to forty mesh Tyler. The solid mixture was 98% shale and 2% safflower hulls by weight. The solids were then mixed in a pug mill with water in the amount of fourteen to sixteen percent of the weight of the solids, in a series of batches. The wet mixture of shale and safflower hulls was then extruded without vacuum (not deaired) and with no oil on the die, making pellets which were ⅝" cubes. These pellets were then dried in a rotary type dryer to a moisture content of four percent, set overnight and recrushed to ⅝" in a rotary crusher. The crushed dried pellets were fed, volume controlled, to a rotary kiln, at a temperature of 1840° F. for a retention time of 19 minutes, because of the characteristics of the raw shale used. The resultant aggregate varied in size from half inch to eight mesh. One such batch had a final density of thirty-six pounds per cubic foot. Another batch had a density of twenty-eight pounds per cubic foot, while a third batch had a density of thirty-eight pounds per cubic foot.

The aggregate of this invention was incorporated into concrete for test purposes. Test blocks were made 2" x 2" x 10" according to ASTM C-330-60T from a mix comprising:

| | Pounds |
|---|---|
| Portland cement (Type II, ASTM C-150-62) | [1] 640 |
| Lightweight sand | 1,076 |
| Aggregate of Ex. 1: | |
| ⅜" and smaller | 402 |
| ⅜" to ¾" | 310 |
| | [2] 2,763 |

[1] 6.81 sacks.
[2] One cubic yard of dry aggregate and sand.

The blocks had, after seven days at the same temperature and humidity, an average compressive strength of 2880 pounds per square inch, as tested by ASTM C-39. under the same test after a total of twenty-eight days at 50% relative humidity and 73° F., the compressive strength was 3960 pounds per square inch.

Example 2.—Shale without treatment (control)

Shale having a density of about 110 pounds per cubic foot from a deposit in Northern California was processed as in Example 1. Raw material was crushed and passed through ten-mesh screens. Shale was then tempered with water in a pug mill to 17% moisture, in preparation for the pellet extrusion process. The tempered clay was extruded and cut as one-half inch cubes, extrusion being without vacuum or oil on die. Then pellets were dried in the rotary type dryer to a moisture content of 4%. The dried pellets were crushed to ⅝" in the rotary crusher and then were fed to a rotary type kiln, the temperature of 1980° F. and retention time of 18 minutes being appropriate for the raw material.

The density of the fired product ranged from 38 to 52 pounds per cubic foot. Using portland cement type II of ASTM C-150-62, blocks were made and tested. The compressive strength results on seven-day tests averaged 2460 pounds per square inch and on twenty-eight-day tests averaged 3710 pounds per square inch, both done as in Example 1.

Example 3.—Shale of Example 2 plus safflower seed hull flakes

Shale like that of Example 2 from the same deposit in Northern California, crushed to less than ten mesh, was mixed with safflower seed hull flakes lying within the size range of 20 to 40 mesh Tyler. The solid mixture was 98% shale and 2% safflower hulls by weight (about 87% shale by volume). The mixture was tempered with a 1½–2% water solution of sodium silicate in a pug mill in an amount lying between 14 and 16% of the solids. The tempered clay, as mixed above, was extruded as one-half inch cubes, extrusion being without vacuum or oil on the die. The pellets were dried in the rotary dryer to a moisture content of four percent, and the dried pellets were crushed to ⅝" in a rotary crusher for preparation to the kiln feed. The crushed dried pellets were fed by volume control to the rotary type kiln, the temperature of 1850° F. and retention time of 19 minutes being adjusted to the raw material. The aggregate density was 32 to 40 pounds per cubic foot.

Using portland cement type II, ASTM C-150-62, test blocks were made and tested as in Examples 1 and 2. On the seven-day test the compressive strength averaged 2170 pounds per square inch, while the average on the twenty-eight day test was 3770 pounds per square inch, thus comparing quite favorably with the heavier material of Example 2.

Example 4.—Shale of Example 2 with treated rice hull flakes

Shale from the same deposit in Northern California as Examples 2 and 3, crushed to less than ten mesh, was mixed with rice hulls that had been treated as outlined earlier, lying within 20 to 40 mesh Tyler screen size. The solid mixture was 98% shale, 2% rice hulls by weight. The clay was tempered with water in a pug mill to 15% to 18% moisture in preparation for the pellet extrusion process, and the tempered clay as mixed above was extruded as one-half inch cubes, the extrusion being without vacuum, de-airing or oil on the die. The pellets were dried in a rotary type dryer to a moisture content of four percent, and the dried pellets were crushed to ⅝" in a rotary crusher in preparation for the kiln feed. The crushed dried pellets were fed, volume controlled, to the rotary type kiln, the temperature of 1840° F. and retention time of 19 minutes being adjusted to the raw material. The density was 28 to 36 pounds per cubic foot. Concrete made as in Examples 2 and 3 gave twenty-eight-day compressive strength results averaging 3760 pounds per square inch.

In both Examples 3 and 4, it was noted that a fuel reduction of 15 to 18 percent was recorded in the kiln, when the safflower and rice hull, clay, and shale mixtures were processed, as compared with Example 2.

Example 5.—like Example 4 but with untreated rice hulls

Shale from the same deposit in Northern California as Example 2 was mixed with *untreated* rice hulls lying within the 20 to 40 mesh Tyler screen size. The solid mixture was 98% and 2% untreated rice hulls by weight. The materials were crushed and passed through a 10 mesh screen, tempered with water in the pug mill at 16% to 18% moisture in preparation for the pellet extrusion process, and extruded as half-inch cubes, without vacuum, de-airing, or oil on the die. The pellets were dried in a rotary type dryer to a moisture content of four percent, and the dried pellets were crushed to ⅝" in a rotary crusher in preparation for kiln feed. The crushed dried pellets were fed, volume controlled, to a rotary type kiln, the temperature being 1840° F. and the retention time 19 minutes.

The density of the final aggregate was 23 to 35 pounds per cubic foot. However, when made into concrete blocks by the same procedures as Examples 2–4, the test after seven days gave an average compressive strength of only 1590 pounds per square inch and the test after twenty-eight days gave a compressive strength of only 2400 pounds per square inch. This shows the effectiveness of the treatment of Example 4.

Example 6.—Lightweight aggregate manufactured with safflower hulls in the manufacture of lightweight clay products A mixture of solids was made comprising clay crushed and ground to less than ten mesh, lightweight aggregates manufactured in Example 3 using safflower hull flakes, crushed to less than four mesh, and additional safflower hulls sized so that 24.0% was between 10 and 20 mesh, 42.9% was between 20 and 35 mesh, 10.1% was between 35 and 60 mesh, and 23% was smaller than 60 mesh. By volume, the mixture comprised 70% clay, 20% lightweight aggregates, and 10% safflower hull flakes. Water containing 2% silicate was added to the solids in the amount of 16% of the weight of the solids. The material was extruded, dried for 28 hours at 380° F., and fired for 30 hours at 1900° F.

The bricks produced had a wire cut texture, were quite hard, and there was no indication on the surface of any aggregate or hull burn out. The color was very good; there was no coring or discoloration. Compressive strength tests on the bricks showed that they had a crushing strength of more than 10,000 pounds per square inch. A water absorption test, including a boil for five hours, showed between 9 and 11%.

Example 7.—Treated sawdust

Next used was two pounds of pine sawdust ground to 20 mesh Tyler screen. Shale from San Bernardino County, Calif., weighing 81.5 pounds per cubic foot was ground to −10 mesh Tyler. Ponderosa pine sawdust was soaked in #2 diesel oil overnight and was then put into a drier for 1½ hours at 110° F. Two pounds of this treated sawdust were mixed with ninety-eight pounds of the ground shale; then water was added to give a total moisture content just before going into the extruder of 17.25%. There was no oil on the extruder die, and a vacuum of 28" was employed. The sawdust and shale mixture was very hard to extrude, and the augers and barrel of the machine had a tendency to heat rapidly, due to the friction. When cut into cubes, the extruded material had a tendency to crumble, having practically no green strength. (When more moisture was added to bring the total moisture content to 19% before putting the material into the extruder, the pellets came out very wet and would not extrude.) The pellets were fired in a batch-type, non-rotary kiln for 18 minutes at about 1860° F. When the pellets were taken from the kiln, they were found to be very soft, and they crumbled. The weight ran from 42 to 48 pounds per cubic foot, with the fines running from 56 to 66 pounds per cubic foot. From these, 2" x 2" x 10" concrete bars were made using six and one-half, ninety-four pound sacks of cement per cubic yard of total dry solids, according to ASTM C-330-60T and ASTM C-150-62, and as aggregate a mixture of 50% material in the range of ¼ to ½" and 50% in the range of 8 to 40 mesh. The seven-day compressive strength, ASTM C-39, was only 1120 p.s.i. The material is thus a failure.

Example 8.—Treated sawdust, with sodium silicate

The same mix as that of Example 7 was used, with the only difference being that the water added to the mix was a one-half percent solution of sodium silicate. The material still was very hard to extrude, but there was friction and barrel heating. The pellets were still poor and very weak upon leaving the machine. The pellets were screened and fired in a kiln for 16½ minutes at up to 1870° F. The results were very soft pellets with poor centers, and a very black core. The weight of the pellets was 42 to 46 pounds per cubic foot for the ¼ to ½" size, and 60 to 64 pounds on the 8 mesh size. When 2" x 2" x 10" bars were made using the cement as in Example 7, after seven days the compressive strength was 1190 p.s.i. A gain of 70 p.s.i. was achieved by using sodium silicate.

Example 9.—Sawdust treated with silicone

Example 7 was repeated using sawdust sprayed with a silicone solution in a paint thinner, known as Thompson's Water Seal, and dried overnight. The pellets were still very weak upon leaving the extruder and had to be handled very carefully in order to keep from breaking them or crumbling them. When the pellets were fired in a kiln for 19 minutes at 1965° F., they came out very soft and with a dark black center. The weight of the pellets produced was 40 to 44 pounds on the ¼ to ½" size and 60 to 66 pounds on the 8 to 40" size. Concrete bars made as in Example 7 had a seven-day compressive strength of 1190 p.s.i.

Example 10.—Sawdust treated as in Example 9 with sodium silicate added

Example 9 was repeated, but replacing the added water with a solution of sodium silicate (a 2% water solution of a 38% aqueous solution). Of all the tests made on sawdust, this material extruded better than any, and the barrel of the machine and the pellets were much firmer upon leaving the die. The pellets were fired in a kiln for 19 minutes to 1870° F. Upon leaving the kiln the pellets were soft and had a dark black core in the center, but the skin on the pellets was considerably heavier than in Examples 7, 8, and 9. The weight of the material produced was 40 to 44 pounds per cubic foot on the ¼ to ½" aggregate and 60 to 66 pounds on 8 to 40 mesh fines. When 2" x 2" x 10" bars were made as before, after seven days the compressive strength was 1280 p.s.i., apparently because of the sodium silicate.

Example 11.—Sawdust treated in safflower oil

The test of Example 10 was repeated, except that the pine sawdust had been treated by being soaked in safflower cooking oil overnight and then put into a drier for 1 hour and 45 minutes at 115° F. The mix ran well; there was little friction. The pellets were soft when extruded, and they were fired in a kiln for 18.5 minutes to 1860° F. The pellets still showed a very dark black center after being taken from the kiln. The skin on the pellets was like that of Example 10. The weight of the aggregate produced: the ¼ to ½" ranged from 40 to 44 pounds per cubic foot; that of the 8 to 40 mesh ranged from 60 to 66 pounds. When 2" x 2" x 10" bars were made as before, the seven-day compressive strength was 1295 p.s.i.

Example 12.—Untreated sawdust

Example 8 was repeated, using sodium silicate, but no treatment whatever was given to the sawdust. The pellets obtained were fired for 19 minutes to 1870° F. and came out very soft and with a very dark center, with a thin skin on the outside. The unit weight of the pellets was not checked. When 2" x 2" x 10" bars were made as before, after seven days the compressive strength of the bars was only 1050 p.s.i.

Example 13.—Safflower hulls

For comparison with Examples 7–12, the tests were repeated in the same manner on the same equipment, changing only from sawdust to safflower hulls ground to −20 mesh Tyler. Moisture was added to 17.5% without sodium silicate. The material extruded very well, and the pellets were good and strong upon leaving the die. They tended to crumble due to some die friction, but as a whole were very firm. The pellets were fired in the kiln for 16 minutes to 1840° F. Upon cooling, the pellets were very firm, and the color in the center of the pellet was light gray. The unit weight of the ¼ to ½" size pellets was 32 to 38 pounds per cubic foot. The unit weight of the 8 to 40 mesh fines was 40 to 46 pounds per cubic foot. The 2" x 2" x 10" bars, made as in Examples 7–12, had a compressive strength after seven days of 2820 p.s.i.

Example 14.—Safflower hulls and sodium silicate

Example 13 was repeated with the only change being the use of a one percent water solution of material consisting of a 38% aqueous solution of sodium silicate, the total moisture content before going into the extruder being 16.5%. The pellets were very firm upon leaving extruder. There was very little cracking. The barrel of the machine did not heat up, and the material extruded uniformly. The pellets were fired in a kiln for 18 minutes to 1840° F. The pellets were very hard upon leaving the kiln, and the center of the pellet had a light gray color. Looking at the pellet under a glass, one could see where it had started to vitrify. The unit weight of the ¼ to ½" size pellets was 30 to 34 pounds per cubic foot. The unit weight of the 8 to 40 mesh fines was 42 to 44 pounds per cubic foot. The 2" x 2" x 10" bars made as before, after seven days had a compressive strength of 2910 p.s.i.

Example 15.—Silicone treated rice hulls

A mix like that of Example 14 was made, but in place of the safflower seed hulls, ground rice hulls, approximately −20 mesh Tyler were treated with Thompson's Water Seal and allowed to dry overnight. A water solution of ½ of 1% sodium silicate was added, the moisture content of the material before going into the extruder being 17.5% water. The material extruded very well, and the barrel of the machine did not heat up. The corners of the pellets when extruded did not pull. The pellets were firm and hard. The pellets were then put into the kiln and fired for 18½ minutes to 1850° F. After cooling, the pellets (when broken open) showed a light gray center, and they were very hard. The unit weight of the ¼ to ½″ pellets was 32 to 36 pounds per cubic foot. The unit weight of the 8 to 40 mesh fines was 40 to 44 pounds per cubic foot. The 2″ x 2″ x 10″ bars made as before had a seven-day compressive strength of 3130 p.s.i.

In commercial production, control is of great importance, and this invention gives it. Since shale, slate and clay vary considerably in organic content and in other qualities, the proportions of added materials and the treatments given will vary widely from one location to another, but after a few trial runs or after the qualities of the raw material are known, the results thereafter can be repeated with much greater consistency than has heretofore been obtainable.

For example, in plants using shales from different locations or variable in quality, it is wise first to mix the shales so as to produce a more uniform blend. The quantity of safflower hulls or the like to be added can be determined from a few trial runs. Where the shale contains a fairly large amount of organic matter, 2% safflower hulls, by weight, may be quite adequate, while other shale may require much more.

The control can be measured from the aggregate obtained, which should have a density of 20 to 45 pounds per cubic foot, and from the strength of test blocks of concrete made therefrom. Thus, when the concrete is made from Portland type II cement, per ASTM C–150–62, at the rate of 6½ sacks per cubic yard of dry materials, the aggregate being all the lightweight product of this invention, half of the aggregate being sized ¼″ to ½″ and the other half from 8 mesh to 40 mesh, compressive strength of at least 2000 pounds per square inch can be obtained in seven days under ASTM C–39. In fact, the strength is usually much higher, running up to around 3500 p.s.i. Also, the 28-day test should give compressive strength of at least 3500 p.s.i.

In commercial production, the firing times will usually be longer than those given in the above tests, because in commercial production there is much more material in the kilns. The pellets may be stacked to a total thickness of eighteen, twenty-four or thirty″, or even more. It therefore usually takes 7–10 minutes to raise the pellets to the sealing temperature of between 750° F. and 1100° F., instead of about 3–5 minutes in laboratory runs. The sealing should be accomplished quickly but without causing the pellets to break. Once sealed, the temperature is raised more slowly up to a higher temperature, which may be as low as 1600° F., in order to bloat slowly and evenly, building up the gas without rupturing the sealed pellets. This typically takes 12 to 20 minutes in commercial production. Once 1600° F. is reached, the temperature can be raised to 1825–2000° F. for vitrification, soaking and burning out of impurities. This takes usually about 10 to 15 minutes, and is judged by the time required to fire out carbon and other impurities and to put on a thick vitreous skin.

A strong skin is important in producing strong aggregate. Apparently, the safflower seed hulls and treated rice hulls are able to impart a thicker and stronger skin due to the amount of heat they are able to supply from inside the pellet. The quantity of heat supplied by them is indicated by the fact that a greater tonnage throughput is obtained when they are in the clay or shale or slate than when they are absent and that this is obtained at the same time that more complete firing is obtained at a lower furnace temperature and with about a 17% reduction in fuel consumption. The obtaining of a lighter, stronger product at less furnace heat input is a surprising result. For example, in comparing Examples 2 and 3, it is seen that the product of this invention, though lighter, is stronger. Also, less fuel was used. Thus, the use of the type of organic materials of this invention gives unexpected results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process for making lightweight aggregate having great strength, comprising the steps of (a) mixing 100 parts of solids comprising 90 to 99% of (1) material selected from the group consisting of ground clay, shale, or slate and (2) 1 to 10% of ground organic bloating material having substantially the water absorption characteristics, gas producing ability, and burnability of safflower seed hulls, and (3) 15 to 25 parts of water, (b) rapidly raising the temperature of the resulting mixture to a sealing temperature of about 750° to 1100° F. and sealing without breaking, (c) slowly raising the temperature after completion of the sealing step to a bloating temperature of about 1600° F. to 1900° F., so as to bloat without rupturing the seal, and (d) raising the temperature after the bloating step to a firing temperature of about 1800° to 2400° F. and providing a thick vitreous coat thereon.

2. The product resulting from the practice of the method of claim 1.

3. The process of claim 1 wherein the water contains up to 2% of sodium silicate.

4. The process of claim 1 wherein the material selected from the group consisting of clay, shale and slate is ground to minus 4 mesh and the organic material to minus 10 mesh.

5. The process of claim 4 wherein the organic bloating material is safflower seed hull.

6. The process of claim 4 wherein the organic bloating material is rice hulls treated by spraying them with diesel oil and kerosene.

7. A process for making lightweight aggregate having great strength, comprising the steps of (a) mixing (1) 90 to 99 parts by weight of ground material chosen from the group consisting of clay, shale and slate, (2) 1 to 10 parts by weight of safflower seed hulls ground to a size smaller than 10 mesh, and (3) 15 to 25 parts by weight of water, (b) pelletizing the mixture, (c) sealing said pellets by rapidly raising their temperature to a sealing temperature of about 750° to 1100° F., (d) bloating said pellets by slowly raising the temperature from the sealing temperature to a bloating temperature of about 1600° to 1900° F. to avoid rupture of the seal during bloating, and (e) firing said pellets at a still higher temperature of about 1800° to 2400° F., said sealing, bloating and firing being being done under reducing conditions.

8. The process of claim 7 wherein the water contains from ½ to 1% to 2% of sodium silicate.

9. The process of claim 7 wherein in step (c) the temperature of sealing lies between about 750° F. and about 1100° F. and is raised as quickly to this level as can be done without breakage of the pellets, then the temperature is raised for bloating up to about 1600° F. sufficiently slowly to avoid rupture of the seal, and then the temperature is raised to a level of about 1800°–about 2000° F. for long enough to provide a thick vitreous skin on the pellets.

10. The product resulting from practice of the process of claim 7.

References Cited
UNITED STATES PATENTS 2,702,748  2/1955  Heine _____ 106—41
2,786,772  3/1957  Stewart et al. _____ 106—40
3,310,614  3/1967  Burkett et al. _____ 106—41

JAMES E. POER, *Primary Examiner.*

TOBIAS E. LEVOW, *Examiner.*